United States Patent [19]

Li et al.

[11] Patent Number: 5,657,407
[45] Date of Patent: Aug. 12, 1997

[54] IMPROVED OPTICAL WAVEGUIDE COUPLING DEVICE HAVING A PARALLELOGRAMIC GRATING PROFILE

[75] Inventors: Ming Li, Oxford; Stephen Sheard, Kidlington, both of England

[73] Assignee: Biota Corp., Locust Valley, N.Y.

[21] Appl. No.: 474,887

[22] Filed: Jun. 7, 1995

[51] Int. Cl.⁶ ................................................. G02B 5/18
[52] U.S. Cl. ............................. 385/37; 385/130; 372/102
[58] Field of Search ..................... 385/37, 130; 372/102, 372/96; 235/462; 257/21

[56] References Cited

U.S. PATENT DOCUMENTS

| | | | |
|---|---|---|---|
| 3,982,810 | 9/1976 | Tamir et al. | 385/37 |
| 4,779,259 | 10/1988 | Kono et al. | 385/37 |
| 5,003,550 | 3/1991 | Welch et al. | 372/102 |
| 5,103,456 | 4/1992 | Scifres et al. | 372/102 |
| 5,122,644 | 6/1992 | Hasegawa et al. | 235/462 |
| 5,220,573 | 6/1993 | Sakata et al. | 372/102 |
| 5,306,925 | 4/1994 | Abe et al. | 257/21 |
| 5,347,533 | 9/1994 | Higashi et al. | 372/96 |
| 5,446,534 | 8/1995 | Goldman | 385/37 |

FOREIGN PATENT DOCUMENTS

| | | | |
|---|---|---|---|
| 60-188909 | 9/1985 | Japan | 385/37 |
| 60-188911 | 9/1985 | Japan | 385/37 |
| 62-296102 | 12/1987 | Japan | 385/37 |
| 0177001 | 7/1989 | Japan | 385/37 |

Primary Examiner—Rodney B. Bovernick
Assistant Examiner—Yisun Song

[57] ABSTRACT

An optical waveguide device comprising an optical waveguide for guiding an optical wave therethrough and a grating coupler, which is located on a surface of or in the vicinity of the optical waveguide and which couples the guided optical wave traveling in the optical waveguide with an external optical wave. The grating coupler is provided with a row of teeth spaced apart by a gap and positioned periodically or quasi-periodically with a pitch along the optical axis. The teeth have front and rear sidewalls, width and height, front and rear blaze angles less than 90°, and preferably have a parallelogramic profile. The width to period ratio of the grating teeth can be variable along the guided wave propagation direction so that the radiated beam can be shaped to a designed profile. The guided wave is radiated very efficiently with a predetermined profile out of the optical waveguide; or an external optical wave, which takes a known form, is introduced very efficiently into the optical waveguide. These grating couplers of the present invention are used in combination with semiconductor lasers and solid state diode detectors to provide improved active and passive opto-electronic devices respectively.

23 Claims, 4 Drawing Sheets

IMPROVED OPTICAL WAVEGUIDE COUPLING DEVICE HAVING A PARALLELOGRAMIC GRATING PROFILE

BACKGROUND OF THE INVENTION

1. Field of the Invention

This invention relates generally to active and passive opto-electronic and photonic devices that include an optical waveguide device. This invention particularly relates to an optical waveguide device which has an optical waveguide for guiding a wave therethrough and a grating coupler disposed on the surface of or into the optical waveguide such that the guided optical wave may be radiated by the grating coupler out of the optical waveguide or an external optical wave may be introduced by the grating coupler into the optical waveguide and which may include a semiconductor diode laser device and/or a semiconductor detector.

2. Description of the Prior Art

In many applications it is required that the grating couplers efficiently radiate most of the guided electromagnetic power into a desired radiation beam within a short coupling length. For example, in a focusing grating coupler used for CD pick-up head, it is not only essential to focus most of the radiated photonic power into a spot, but also necessary to suppress the transmitted guided photonic power remaining in the optical waveguide and spurious radiation beam(s) which will otherwise contribute to the loss of power.

It is well-known that within a waveguide grating region the guided wave, $P_g(z)$, is an exponentially decaying electromagnetic wave along the propagation direction $$P_g(z) = P_o \exp(-az), \quad (0 < z < L) \tag{1}$$

where z is the propagation direction, $P_o$ is the incident guided power at z=0, a is the power radiation factor, and L is the total length of the grating. The grating radiation directionality ('Branching Ratio'), R, is defined as the percentage of the total radiation power directed into a desired radiation beam and the output coupling efficiency of the grating couplers is:

$$\eta = R[1 - \exp(-aL)] \times 100\% \tag{2}$$

From Eq.(2) it occurred to us that the second term denotes the total amount of the incident guided power being radiated by the grating and that, for a given grating length L, both a large radiation directionality R and a large radiation factor a are required for high-efficiency output coupling.

Originally, grating couplers used symmetrical tooth profiles (e.g. rectangular, and sinusoidal etc.), such profiles did not present good radiation directionality. Subsequently, as proposed by S. T. Peng and T. Tarnir in "Directional blazing of waves guided by asymmetrical dielectric gratings", Optics Communications, 11, 405–409 (1974), asymmetrical (or blazed) gratings were used for optical waveguide structures in an attempt to scatter the modal energy preferentially. However, all such previous asymmetrical designs concentrated on the sawtooth (trapezoidal or triangular) grating tooth profiles. Unfortunately this type of grating had the following problems: (1) although a large radiation directionality is available, the radiation factor is reduced; (2) due to the geometric constraint as discussed below in connection with FIG. 3, the blaze angle (or radiational directionality R) and the grating depth (or radiation factor a) can not be independently controlled. These problems restrict the application of the sawtooth gratings.

For input coupling, however, we found that a third term called the beam overlap coefficient, M(g,h) must be included in Eq.(2) in order to determine the input coupling efficiency. Referring to Eq.(3), g(z) is the complex amplitude distribution of the radiation beam arising from the output coupling, h(z) is the complex amplitude distribution along the grating of the input beam, and M(g,h) is defined as $$M(g,h) = \frac{\left[\int_{-\infty}^{+\infty} g(z)h(z)dz\right]^2}{\int_{-\infty}^{+\infty} g^2(z)dz \int_{-\infty}^{+\infty} h^2(z)dz} \tag{3}$$

where M(g,h) is less than unity. Generally, the input coupling efficiency is lower than the corresponding output coupling efficiency; attributed to the dissimilarity between the radiation and the input beam.

To increase the input coupling efficiency, we found that it is therefore necessary to shape the radiation beam profile so as to increase the similarity between the radiation and the input beam, i.e. M(g,h). Although other investigators attempted to modify the beam profile, for example, by varying the grating tooth depth along the guided wave propagation direction as described in U.S. Pat. No. 5,101,459, issued Mar. 31, 1992, to H. Sunagawa, such techniques were not fully compatible with the standard VLSI dry etching technology, since a uniform etching depth is generally obtained within a large area. In addition, Sunagawa's device could not simultaneously control R and a.

On the other hand, we discovered that both R and a can be simultaneously optimized using our invention. Further background is provided in our article in Optics Communications 109 (1994) pp239–245.

SUMMARY OF THE INVENTION

The primary objective of the present invention is to provide an optical waveguide device, wherein a guided optical wave is radiated very efficiently out an optical waveguide by a grating coupler into a desired direction.

Another objective of the present invention is to provide an optical waveguide device, wherein an optical wave is introduced very efficiently into an optical waveguide.

The present invention provides an optical waveguide device comprising:

a) an optical waveguide for guiding an optical wave therethrough, and b) a grating coupler, which is fabricated on the surface, or in said waveguide and which couples the guided optical wave traveling in said optical waveguide with an external optical wave, wherein said grating having rows of teeth separated by a gap in said waveguide and positioned periodically with a pitch along said optical axis;

said teeth having front and back side walls, front blaze angles, and rear blaze angles;

said angles being less than 90 degrees relative to said optical axis and teeth preferably having a parallelogramic profile so as to efficiently radiate (or receive) electromagnetic waves from (or into) the said waveguide, and said grating preferably having variable gap to pitch ratio in the direction along which the guided optical wave travels.

Yet another object is to provide an improved electro-optic device wherein a narrow beam emitted by an edge-emitter laser is transformed into a two-dimensional beam equivalent to beams emitted by a surface emitter laser.

Yet another object is to provide an improved diode detector for electromagnetic radiation.

Yet another object is to provide an integrated optical device for reading anolog and digital information stored on compact discs and bar codes.

The preferred mode of our invention is the combination of deep parallelogramic shaped grating with integrated optical waveguides and optoelectronic devices, including surface emitting lasers and detectors. This invention is contrary to conventional thinking, that optical waveguide gratings must have teeth with positive or zero degree internal blaze angles (as defined in FIG. 4) relative to the normal of the waveguide optical axis. Our invention, in contrast to this view, relies upon the additional physical phenomena of Bragg scattering between the grating teeth by using positive front and negative rear blaze angles. Our unexpected discovery dramatically enhances the output grating efficiency as discussed below in connection with FIG. 6.

DESCRIPTION OF THE PREFERRED EMBODIMENTS

The present invention is described below in further detail with reference to the accompanying drawings.

Figure 1:
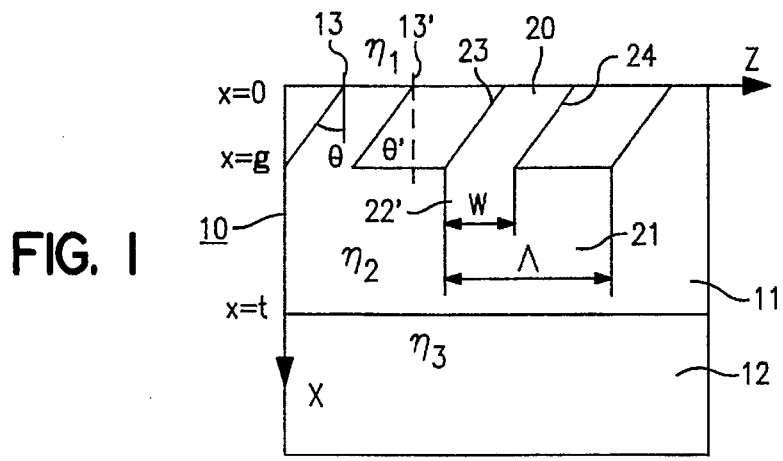
FIG. 1 illustrates a cross-sectional view of a parallelogramic grating coupler in an embodiment of the optical waveguide device in which W is the thickness and Λ is the period of the teeth in accordance with the present invention wherein θ and θ' are the angles of the front and rear facets respectively with respect to the normals to the optical axis.

FIG. 1 is a partial side view of a parallelogramic grating coupler in an embodiment of the optical waveguide device in accordance with the present invention. An optical waveguide device 10 comprises a substrate 12, which, for example, may be crystal silicon with a silica-on-silicon substrate, a slab-shaped waveguide 11 formed on the substrate 12, and a grating coupler with substantially parallelogramic teeth 20 on the surface of the waveguide 11. Alternatively, the grating coupler may be located in a thin film (not shown) beneath or on top of the waveguide 11. Each grating tooth 20 has a front 23 and a rear 24 facet, which respectively has a front and a rear internal blaze angles θ and θ'. In the present invention a parallelogramic profile, such as shown in FIG. 1, means that the front and rear facets are substantially parallel to one another. In addition, the internal angle θ of the front facet 23 is defined as positive with respect to the normal to the axis 13, and the angle θ' of the rear facet 24 is defined as negative with respect to the normal to the axis 13' because it is outside the tooth in contrast to the angle θ' of the rear facet of the trapezoidal profile, as discussed below in connection with FIG. 4. Surprisingly, as discussed above In connection with Equation 3, the parallelogramic profile unexpectedly provided substantially improved coupling efficiency compared to the sawtooth and trapezoidal profiles, as discussed below in connection with FIGS. 3–5. The grating teeth 20 are separated with each other by a pitch A 21 and they have tooth widths W 22, and the grating width-to-pitch ratio is defined as (W/A).

Figure 2:
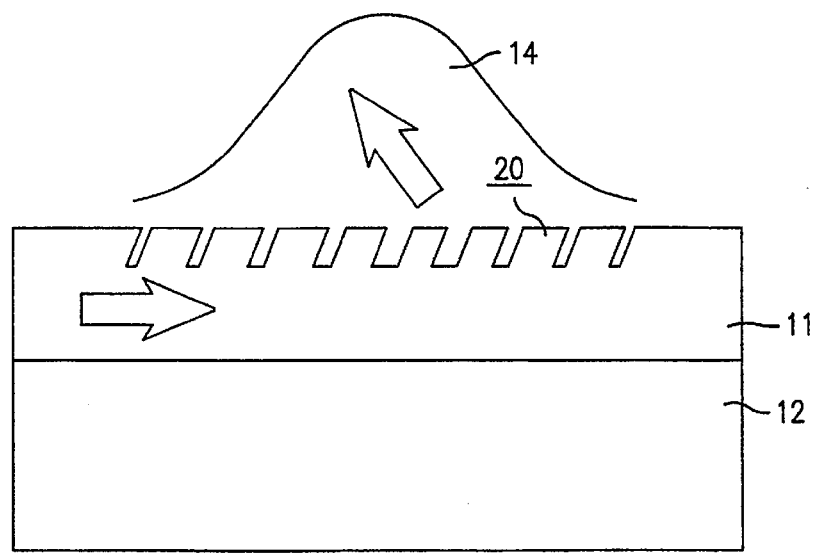
FIG. 2 is a schematic side view showing a grating coupler with variable width-to-period ratio in an embodiment of the optical waveguide device in accordance with the present invention.

As discussed below in connection with FIG. 6, our present invention, which includes a grating coupler with such parallelogramic tooth profile as described in connection with FIG. 1, provides electro-optic devices with substantially increased output coupling efficiency compared with the prior art. We found that to achieve; a high input coupling efficiency, however, the radiation beam profile must be similar to the ideal input beam profile. But; although the input and output beams can take various forms, Gaussian profiles are preferred in many cases. FIG. 2 illustrates a schematic side view showing a grating coupler 10 designed to shape the grating output beam profile 14 by controlling the width-to-pitch ratio of the grating teeth 20 along the guided wave propagation direction, thereby enhancing the grating radiation factor which is a strong function of such width-to-pitch ratio. Such a grating coupler with variable width-to-pitch ratio may be fabricated using the standard VLSI plasma etching techniques and conventional photo or electron-beam lithography, thereby overcoming the disadvantages of the prior art discussed above that make use of a variable tooth depth grating coupler to shape the beam.

Figure 3:
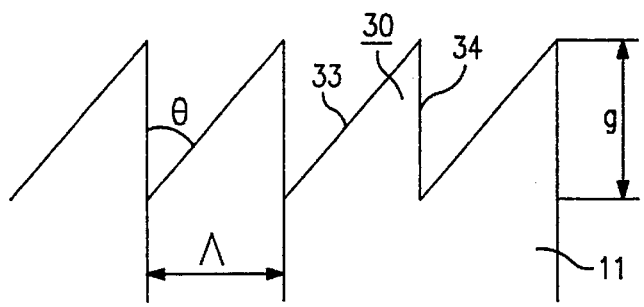
FIG. 3 is a cross-sectional schematic showing the geometric constraint of a sawtooth grating having a height g and period Λ.

FIG. 3 is a cross-sectional diagram showing a prior art grating coupler with a sawtooth profile such as, for example, the device mentioned above as described by S. T. Peng and T. Tamir in "Directional blazing of waves guided by asymmetrical dielectric gratings". Optics Communications, 11, 405–409 (1974). If, hypothetically, such a sawtooth grating coupler were incorporated in the optical waveguide device 10 (FIG. 1) in accordance with the present invention, the geometric constraint would limit the coupling efficiency. Although the radiation factor a depends on various factors, it is most strongly dependent on the grating depth g. But the radiation factor R is typically a single-maximum function of the blaze angle $\theta$ as discussed by R. L. Roncone, L. Li, K. A. Bates, J. J. Burke, L. Weisenbach and B. J. J. Zelinski, "Design and fabrication of a single leakage-channel grating coupler", Applied Optics, 32, 4522–4528 (1993); so, once a is chosen, g becomes fixed. However, the value of g to obtain the desired value of a may not be the value required for optimum $\theta$ (and thus the optimum radiation directionality R). Therefore, for a sawtooth grating the interdependence of a, g, $\theta$, and R results in a loss of design flexibility and loss of efficiency compared with our parallelogramic grating such as described above in connection with FIG. 1.

Figure 4:
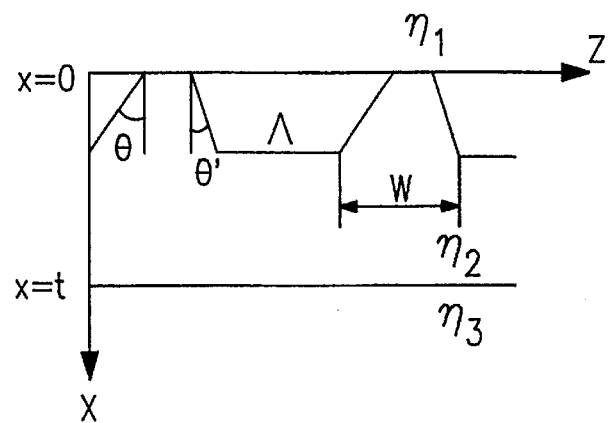
FIG. 4 illustrates a side cross-sectional schematic view of a trapezoidal grating coupler in an embodiment of the optical waveguide device in accordance with the present invention where the grating teeth facet angles are defined internally with respect to the normal of the z axis, positive angles being defined by θ and θ' in the figure.

FIG. 4 is a prior art cross-sectional schematic of a grating coupler having teeth with a trapezoidal profile such as, for example, described by W. Streifer, R. D. Burnham, and D. R. Scifres, "Analysis of grating-coupled radiation in GaAs/GaAlAs lasers and waveguides—II: blazing effects", IEEE Quantum Electronics, QE-12, 494–499 (1976). As shown in FIG. 4, both angles $\theta$ and $\theta'$ are positive. In contrast, in our invention such as, for example, shown in FIG. 1, the front internal blaze angle is defined as being positive since the front facet angle $\theta$ is measured to the left of the normal with respect to the z axis shown in FIG. 4; but the rear internal blaze angle is defined to be negative because the rear facet angle $\theta'$ shows an undercut profile, i.e., the angle is measured to the .left of the normal with respect to the z axis shown in FIG. 4.

Figure 5A:
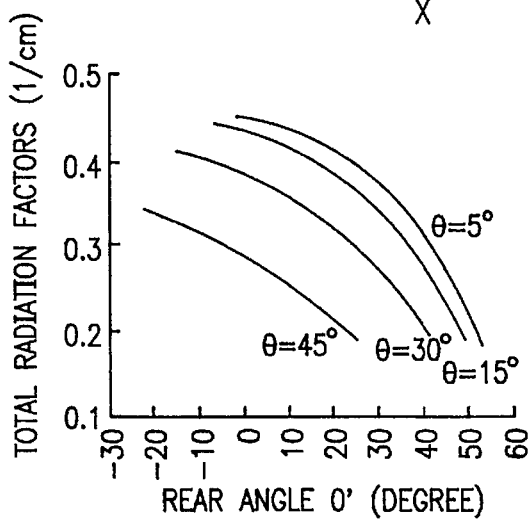
FIG. 5a illustrates the computer simulation results of the radiation factors of a trapezoidal grating (shown in FIG. 4) versus the rear blaze angle θ'.
Figure 5B:
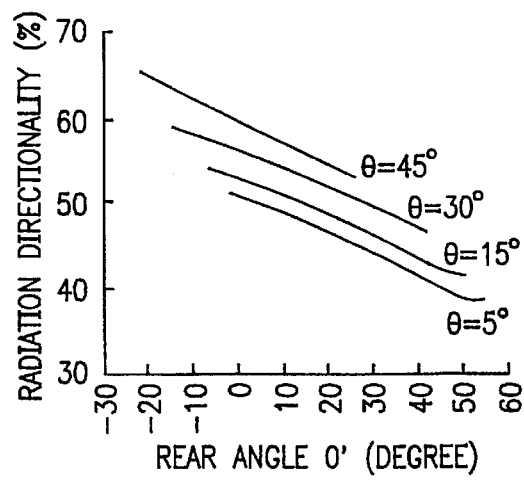
FIG. 5b illustrates the computer simulation results of the radiation directionality of a trapezoidal grating versus the rear blaze angle θ'.

FIG. 5 illustrates the computer simulation results of the radiation characteristic of the trapezoidal grating shown in FIG. 4 versus the rear blaze angle $\theta'$. Contrary to conventional designs, such as for example sawtooth and trapezoidal gratings which generally have positive rear blaze angle $\theta'$, we discovered that when we extended the analysis to negative values of $\theta'$ we could simultaneously obtain a large a and a large R, and hence according to Eq.(2) obtain a high coupling efficiency. Thus, the present invention that includes a grating tooth profile with an undercut rear facet (i.e. a negative rear blaze angle $\theta'<0$), for example the parallelogramic or approximate parallelogramic shape shown in FIG. 1 and FIG. 2, unexpectedly provides substantial advantages over the prior art as discussed below in connection with FIG. 6a and FIG. 6b.

Figure 6A:
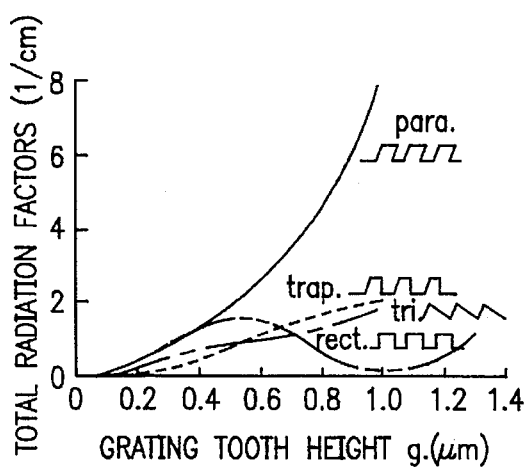
FIG. 6a illustrates the computer simulation results which compare the total radiation factors versus grating tooth height g of the grating couplers with rectangular, triangular, trapezoidal and parallelogramic tooth profiles.
Figure 6B:
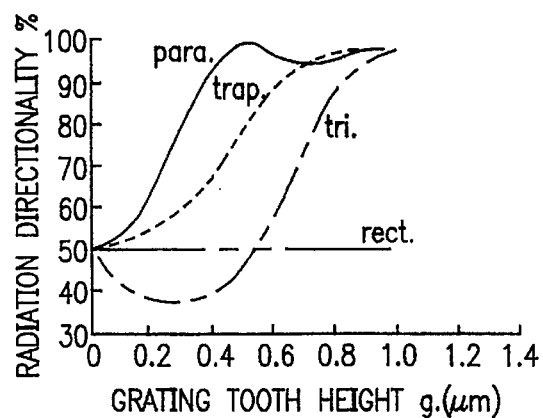
FIG. 6b illustrates the computer simulation results which compare the radiation directionality versus grating tooth height g of grating couplers with rectangular, triangular, trapezoidal and parallelogramic tooth profiles.

FIG. 6a and FIG. 6b show the radiation factors and directionality versus grating tooth height g of grating couplers with parallelogramic tooth profile as designed in accordance with the preferred embodiment of the present invention compared with trapezoidal, triangular and rectangular tooth profiles, as designed in accordance with the prior art. The method described by W. Streifer, R. D. Burnham, and D. R. Scifres in "Analysis of grating-coupled radiation in GaAs/GaAlAs lasers and waveguides—II: blazing effects", IEEE Quantum Electronics, QE-12, 494–499 (1976) was used for these calculations, with $n_1=1.458$, $n_2=1.492$, $n_3=1.460$, $t=2.0$ μm, $\theta=30°$, $\Lambda=0.6$ m, and $\lambda=1300$ nm. Then we discovered that for a large g, a parallelogramic grating coupler can simultaneously provide a substantially larger a and a larger R than a rectangular, a tapezoidal and a triangular grating coupler. Therefore, a more efficient and more compact grating coupler can be obtained using a parallelogramic tooth profile. Another advantage of a parallelogramic or approximate parallelogramic grating is that unlike a sawtooth grating it does not suffer from the geometric constraint; that is, g (or a) and $\theta$ (or R) can be independently designed for parallelogramic or approximate parallelogramic gratings.

Figure 7:
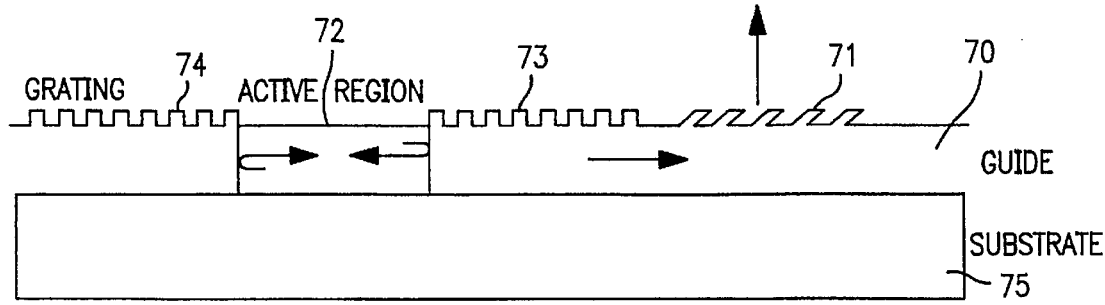
FIG. 7 illustrates a schematic of an electro-optic device that includes an edge-emitter distributed feedback (DFB) laser, an optical waveguide and a parallelogramic grating as an output coupler to radiate a two-dimensional electromagnetic wave.

The present invention can be applied to a broad range of photonic and opto-electronic devices, e.g. laser and light emitting components, devices or modules. FIG. 7 illustrates a schematic of an opto-electronic device having a laser, a waveguide and a parallelogramic grating as an output coupler to radiate efficiently a two-dimensional beam. As shown in FIG. 7, active region 72 in combination with Bragg reflectors 73 and 74 generate electromagnetic waves in a similar way to the DFB or DBR laser oscillators described by S.M. Sze in Section 7.3 of his book 'SEMICONDUCTOR DEVICES', and in the book 'OPTICAL FIBRE TELECOMMUNICATIONS II' edited by S. E. Miller and I. P. Kaminow FIG. 13.8 on p. 536 Section 13.3.3, Academic Press, 1988. Bragg reflectors 73 and 74, which are partially reflecting and totally reflecting, respectively, are shown to provide both optical gain and amplification of the electromagnetic wave as a laser beam. The beam generated by active region 72 and Bragg reflectors 73, 74 is aligned with the optical axis of the optical waveguide 70, which has a parallelogramic grating 71 of the type, for example, described above in connection with FIG. 1. The substrate 75 may be, for example, high-resistivity GaAs, shown as a common supporting substrate for active region 72, Bragg reflectors 73 and 74, and optical waveguide 70 which may be an alloy of GaAs or other dielectric or semiconductor materials with suitable refractive index relative to the substrate for confining the wave. Other laser oscillators may be used, such as a double-heterostruture p-n junction laser described by S. M. Sze "SEMICONDUCTOR DEVICES" pp 276, FIG. 27. In addition, GaAs quantum well lasers are particularly useful as the electromagnetic generating source for the active region 72. GaAs and its alloys may be included in the above mentioned lasers. All such lasers emit electromagnetic waves from the edge of their semiconductor junctions, thereby forming narrow beams which are a function of the semiconduction junction width or the quantum layer width (which can be as thin as 100A), i.e. emitting essentially one-dimensional beams. But, as shown in FIG. 7, the beam is emitted at an angle normal to the optical axis and with a two-dimensional cross-sectional area as determined by the grating 71 area. Furthermore, an array of such lasers can be integrated onto the same substrate.

Therefore, in our invention such as the opto-electronic device described in FIG. 7 is particularly useful for fiber-optic telecommunications because it converts the narrow output beam geometry of edge-emitting lasers into a two-dimensional geometry beam with a desired cross-section by controlling the dimension of the parallelogramic grating 71. Such edge emitting lasers as used in prior art devices are disadvantageous for use in devices in which fiber optic cables are coupled to optical waveguides because of diffraction loss connected with narrow beams. On the other hand, the output electromagnetic wave emitted by our grating coupler can be expanded to any desired area, thereby overcoming the significant disadvantages of edge-emitting lasers in such applications.

Figure 8:
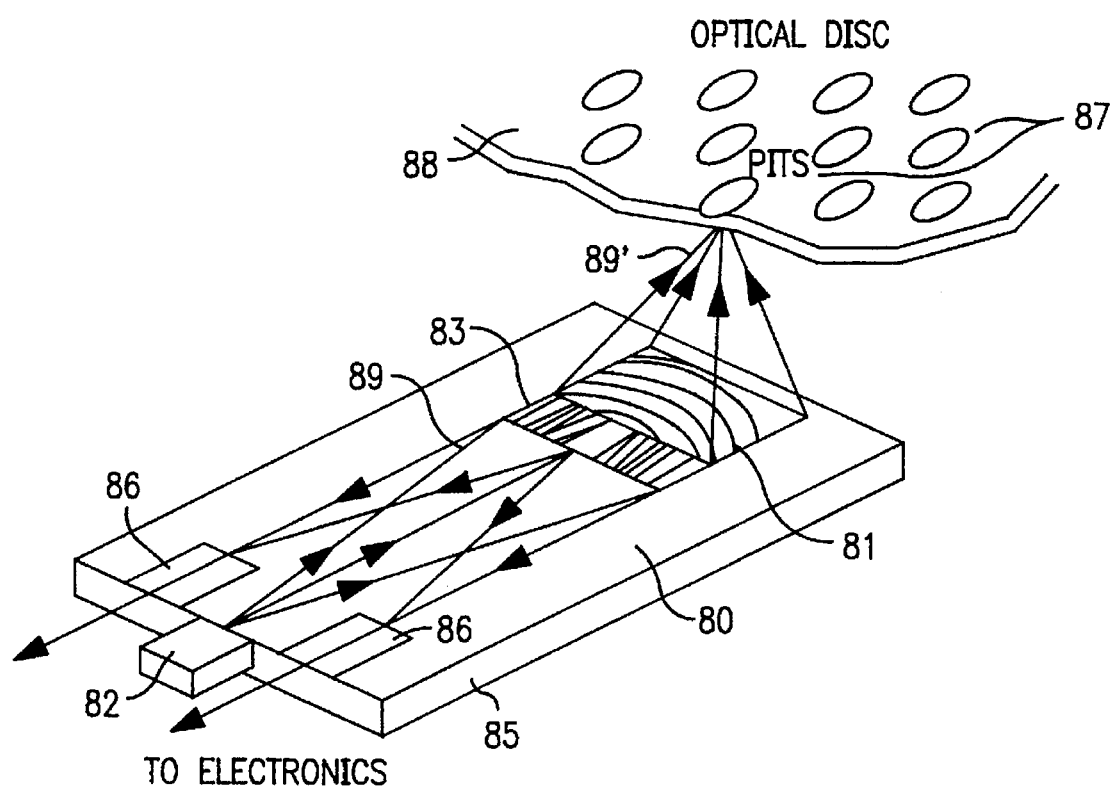
FIG. 8 shows a schematic of an integrated optical device using a focusing grating coupler with a parallelogramic tooth profile for reading information stored on a compact disc.

Another example of the invention is illustrated in FIG. 8 which shows a compact disc (CD) pick-up head, using a focusing grating coupler with a parallelogramic tooth profile as a scanner or reader (writer) with high coupling efficiency. As shown in FIG. 8, a focusing grating coupler (FGC) 81 is fabricated in or on the surface of the planar waveguide 80 in accordance with the concepts shown in FIG. 1 and FIG. 2.

The FGC comprises a group of curved gratings, which can be fabricated by conventional electron-beam lithography, such as described for example by S. Ura, T. Suhara, H. Nishihara and J. Koyama, "An integrated-optic disk pickup device", J. of Lightwave Technology, LT-4, 913–917 (1986). An electromagnetic wave is generated by laser diode 82 or other suitable radiation sources, such as described in the books by Sze and by Miller et al referenced above. The generated wave 89 is coupled into the planar waveguide 80, where propagates down the waveguide 80 as a diverging beam which passes through the twin grating focusing beam splitter 83, and is then coupled by the curved focusing grating coupler 81 with the external electromagnetic beam 89'. Beam 89' is focused onto a pit 87 of the compact disc 88. The beam 89' is reflected from the pit 87 as an electromagnetic wave (not shown) and a portion of such reflected wave is intercepted by grating coupler 81 and coupled into waveguide 80 where it interacts with twin grating beam splitter 83 and where it is focused onto twin detectors 86. Beam splitter 83 is designed with a Bragg angle so that generated beam 89 only weakly interacts with beam splitter 83 as it propagates through wave guide 80. But, reflected wave 89' strongly interacts with beam splitter 83 as it propagates in the reverse direction through the waveguide 80 using design concepts; well known in the art, as described in the book by Miller et al. Photodetectors 86 then transform the detected electromagnetic wave into an electric signal which may be processed by suitable electronic circuits (not shown) off-chip.

In both applications described above and shown in FIG. 7 and FIG. 8, the radiated beam profiles can be designed (e.g. a Gaussian profile) using grating couplers with variable width-to-pitch ratio, as shown in FIG. 2, while still maintaining high coupling efficiencies in both directions between the internal and external electromagnetic wave. Although other scanning devices with a focusing grating coupler have been described, such as in U.S. Pat. No. 5,146,080, issued Sep. 8, 1992 to Opheij, such devices use teeth with the inefficient prior art profiles shown in FIG. 6a which cannot simultaneously attain high radiation factor and radiation directionality Thus the present invention unexpectedly possesses substantially superior properties compared to previous scanning, reading or writing heads compared to the prior art.

Furthermore, the optoelectronic device shown in FIG. 8 can be used to scan or read or write on other recorded surfaces and remain within the scope of the invention. For example, the optical disc can be replaced by a device having a recorded surface such as bar codes with different radiation reflectivity. The operation of the reading device is essentially the same as that described above in connection with FIG. 8 provided that the scanning rate and signal processing circuits are appropriately designed using techniques well known in the art in which either the recorded surface and the scanner/reader are moved relative to one another. Suitable focusing grating couplers were described by T. Suhara & H. Nishihara in IEEE Journal of Electronics, QE 22, 6, p. 845–867, June 1986.

Figure 9A:
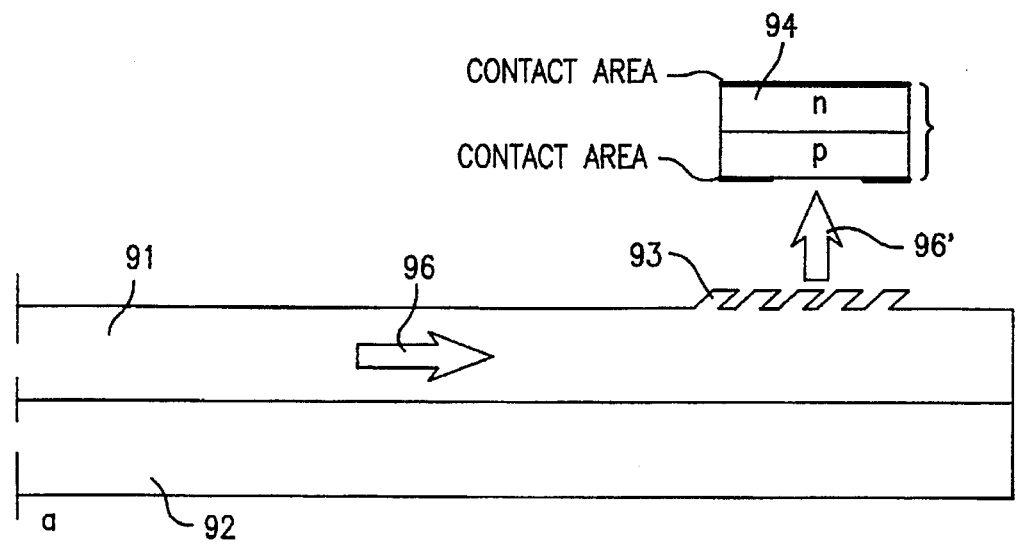
FIG. 9a shows a schematic cross-section of a passive photonic detector that includes an optical waveguide in which electromagnetic waves are propagated along the waveguide and radiated by a parallelogramatic grating into a p-n junction photodetector.
Figure 9B:
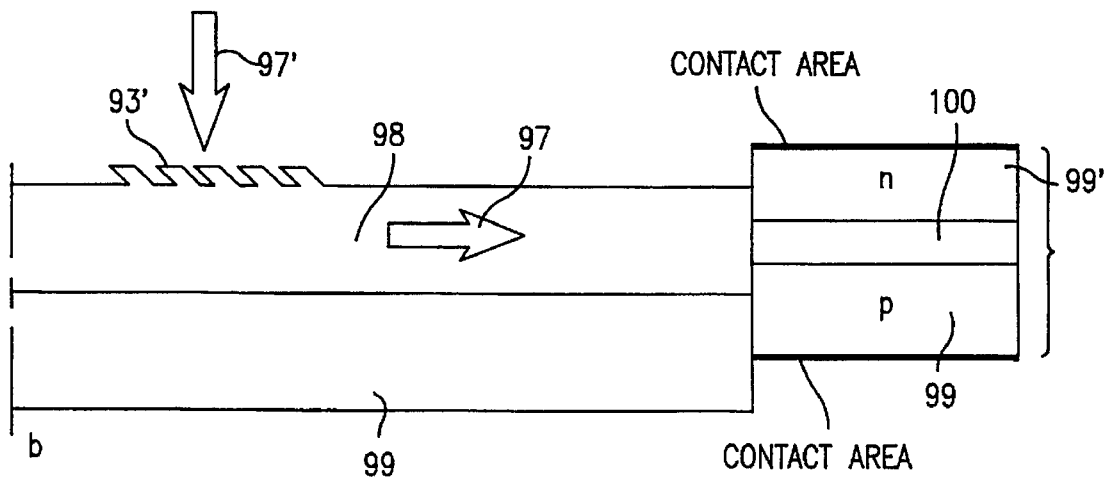
FIG. 9b shows a schematic cross-section of a photonic device in which electromagnetic waves are propagated along a waveguide longitudinally into the edge of a semiconductor diode detector.

FIG. 9a Illustrates a cross-sectional schematic of an electro-optic device showing an electromagnetic wave 96 propagating down waveguide 91 onto substrate 92 into grating 93 with a parallelogramic profile and preferably with variable width-to-pitch ratio as described above in connection with FIG. 1 and FIG. 2. Beam 96 is then coupled into an external radiated beam 96' which illuminates a p-n unction photodiode 94 fabricated from a semiconductor such as GaAs, Ge or InP and their alloys, such as described by Sze in his book referenced above. FIG. 9b shows an external electromagnetic wave 97' being intercepted by parallelogramic grating 93, which couples the external wave 97' to internal wave 97 in waveguide 98. Electromagnetic wave 97 propagates along the optical axis of waveguide 98 longitudinally into a quantum well layer 100 positioned between the p and n layers of semiconductor photodiodes 99. Waveguiding layers 91, 98 and the substrate materials 92, 99 can be of semiconducting materials such as Si, Ge, GaAs, InP and their alloys or glass-like materials with suitable refractive index differences to confine the wave. As discussed by Sze and by Miller et al, the grating regions 93 and 93' with parallelogramic teeth are designed for both input and output coupling as discussed above in connection with FIG. 1 and FIG. 2.

Although front face and edge illuminated detectors have been used previously in devices with optical coupling, such devices used teeth with sawtooth, trapezoidal or rectangular teeth which yielded low coupling efficiency, as discussed In connection with FIG. 6. Furthermore, U.S. Pat. No. 4,725,870, issued Feb. 16, 1988 to Bean, Luryl and Pearsall, described a photodiode with edge-detection which absorbs light longitudinally in its junction to achieve fast response; but, since no coupling device is provided, its efficiency is even lower. The present invention provides photonic detectors with substantially enhanced efficiency.

We claim:

1. An optical waveguide device comprising in combination:

an optical waveguide with an optical axis for guiding an optical wave therethrough; and, a grating coupler, which is fabricated on the surface or in said waveguide and which couples the guided optical wave traveling in said optical waveguide with an external optical wave, said grating coupler having rows of teeth spaced apart by a gap in said waveguide and being positioned periodically or quasi-periodically with a pitch along said optical axis, said teeth having front and back sidewalls, front blaze angles, rear blaze angles, width and height and said sidewalls having a substantially parallel relation to one another and being positioned with said front blaze angles of more than 0° relative to the normal to said optical axis wherein the angles are measured in the same reference plane and for front and rear sidewalls of the same row.

2. The optical waveguide device comprising in combination:

an optical waveguide with an optical axis for guiding an optical wave therethrough; and, a grating coupler, which is fabricated on the surface or in said waveguide and which couples the guided optical wave traveling in said optical waveguide with an external optical wave, said grating coupler having rows of teeth spaced apart by a gap in said waveguide and being positioned periodically or quasi-periodically with a pitch along said optical axis, said teeth having front and back sidewalls, front blaze; angles, rear blaze angles, width and height and said sidewalls having a substantially parallel relation to one another and being positioned with angles of less than 90° relative to said optical axis wherein said teeth have a substantially parallelogramic profile.

3. The optical waveguide device as defined in claim 1 wherein said rear sidewalls of said teeth have negative blaze angles.

4. The optical waveguide device as defined in claim 1 wherein said grating teeth are spaced apart with a varying ratio of said width to said pitch in the direction of said optical axis along which said guided optical wave travels so as to vary the radiation beam profile.

5. The optical waveguide device as defined in claim 1 wherein said grating coupler radiates the guided optical wave out of said optical waveguide.

6. The optical waveguide device as defined in claim 1 wherein said grating coupler introduces the external optical wave into said optical waveguide.

7. The optical waveguide device as defined in claim 1 wherein said front sidewall is positioned with a positive blaze angle in the direction of propagation relative to said optical axis and said rear sidewall having a negative blaze angle relative to said optical axis.

8. An optoelectronic device having an optical axis comprising:

an active region that includes a source of electromagnetic radiation;

a waveguide region for confining and propagating said electromagnetic radiation along said optical axis; and, a grating coupler having rows of teeth with parallelogramic profiles which are fabricated on or in the surface of said waveguide so as to couple said electromagnetic wave In said optical waveguide with an external electromagnetic wave, said rows of teeth being spaced apart by a gap in said waveguide and being positioned periodically or quasi-periodically with a pitch along said optical axis; said teeth having front and back sidewalls, front blaze angles, rear blaze angles, width and height; and, said sidewalls having a substantially parallel relation to one another and being positioned with an angle of less than 90° relative to said optical axis.

9. The optoelectronic device as defined in claim 8 wherein said source comprises a distributed feedback laser.

10. The optoelectronic laser device as defined in claim 8 wherein said source comprises a distributed Bragg reflector laser.

11. The optoelectronic device as defined in claim 8 wherein said source comprises a semiconductor device having a p-n junction.

12. The optoelectronic device as defined in claim 8 wherein said source comprises a quantum well laser having an optical axis, said optical axis of said quantum well laser being aligned longitudinally with said optical axis of said optoelectronic device.

13. The optoelectronic device as defined in claim 8 wherein said source comprises a Bragg reflector laser and said grating coupler comprises GaAs and alloys of GaAs.

14. The optoelectronic device as defined in claim 8 wherein said source comprises a laser comprising GaAs and alloys of GaAs.

15. An optoelectronic device comprising:

a waveguide region having an optical axis for confining and propagating an internal electromagnetic wave along said optical axis;

a grating coupler having rows of teeth with parallelogramic profile which are fabricated on or in the surface of said waveguide so as to couple said internal electromagnetic wave with an external electromagnetic wave; and, a detector juxtaposed to said coupler so as to intercept said external radiation and to convert said intercepted external radiation into an electronic signal wherein said rows of teeth have front and back sidewalls which are positioned with angles of less than 90° relative to said optical axis.

16. An optoelectronic device comprising:

a waveguide region having an optical axis for confining and propagating an internal electromagnetic wave along said optical axis;

a grating coupler having rows of teeth with parallelogramic profile which are fabricated on or in the surface of said waveguide so as to couple an external electromagnetic wave with said internal electromagnetic wave; and, a detector comprising a semiconductor Junction positioned longitudinally on said optical axis of said waveguide so as to transform said internal electromagnetic wave into an electronic signal wherein said rows of teeth have front and back sidewalls which are positioned with angles of less than 90° relative to said optical axis.

17. The optoelectronic device as described in claim 16 wherein said semiconductor junction comprises a p-n junction.

18. The optoelectronic device as described in claim 15 wherein said semiconductor junction comprises a quantum well layer, said quantum well layer being aligned longitudinally with said optical axis.

19. An optoelectronic reading device comprising:

a source of electromagnetic radiation;

a waveguide region with an optical axis for confining and propagating said electromagnetic radiation along said optical axis;

a grating coupler having rows of teeth with parallelogramic profiles which are fabricated on or in the surface of said waveguide so as to couple the electromagnetic wave propagating in said waveguide with an external electromagnetic wave;

a surface juxtaposed to said grating coupler so as to reflect back a portion of said external electromagnetic wave into said grating coupler and in said waveguide; and, a detector positioned in said waveguide so as to convert said reflected electromagnetic wave in said waveguide into an electronic signal wherein said rows of teeth have front and back sidewalls which are positioned with angles of less than 90° relative to said optical axis.

20. The optical reader as defined in claim 19, wherein a focusing beam splitter is positioned in said waveguide between said grating coupler and said detector so as to interact with said reflected electromagnetic radiation and to focus said reflected electromagnetic radiation into said detector, said focusing beam splitter weakly interacting with said electromagnetic radiation in said waveguide propagating from said source.

21. The optical reader as defined in claim 19 wherein said rows of teeth of said grating are spaced so as to focus said external radiation to said surface.

22. The optical reader as defined in claim 21 wherein said surface comprises pits on a compact disc.

23. The optical reader as defined in claim 19 wherein said surface comprises bar codes having different reflection coefficients.

* * * * *